United States Patent
Gulam (10) Patent No.: US 9,690,612 B2
(45) Date of Patent: Jun. 27, 2017

(54) DYNAMICALLY MANAGING A SERIAL PORT INTERFACE OF VIRTUALIZATION SOFTWARE ON HOST DEVICE WHEREIN EXECUTION IS PERFORMED NOT DURING BOOT SEQUENCE

(71) Applicant: VMware, Inc., Palo Alto, CA (US)

(72) Inventor: Nagib Gulam, Austin, TX (US)

(73) Assignee: VMware, Inc., Palo Alto, CA (US)

( * ) Notice: Subject to any disclaimer, the term of this patent is extended or adjusted under 35 U.S.C. 154(b) by 108 days.

(21) Appl. No.: 14/570,154

(22) Filed: Dec. 15, 2014

(65) Prior Publication Data

US 2016/0170786 A1    Jun. 16, 2016

(51) Int. Cl.
| | | |
|---|---|---|
| *G06F 13/00* | (2006.01) | |
| *G06F 9/455* | (2006.01) | |
| *G06F 9/44* | (2006.01) | |
| *G06F 9/445* | (2006.01) | |
| *G06F 13/42* | (2006.01) | |
| *G06F 9/54* | (2006.01) | |

(52) U.S. Cl.
CPC ........ *G06F 9/45558* (2013.01); *G06F 9/4411* (2013.01); *G06F 9/44521* (2013.01); *G06F 9/543* (2013.01); *G06F 13/4282* (2013.01); *G06F 2009/45575* (2013.01); *G06F 2009/45579* (2013.01)

(58) Field of Classification Search
CPC ........................... G06F 9/45558; G06F 9/4411
USPC ...................................... 710/14–19; 714/744
See application file for complete search history.

(56) References Cited

U.S. PATENT DOCUMENTS

| | | | |
|---|---|---|---|
| 6,711,245 B1 * | 3/2004 | Mardinian | H04L 12/66 379/110.01 |
| 9,323,722 B1 * | 4/2016 | Kol | G06F 3/048 |

* cited by examiner

Primary Examiner — Tammara Peyton
(74) Attorney, Agent, or Firm — Patterson & Sheridan LLP (57) ABSTRACT

One or more examples provide techniques to dynamically manage serial port interface(s) of virtualization software executing in a host device. In an example, a method of managing a serial port interface of a virtualization software executing on a host device includes: receiving input characters through the serial port interface to a serial port of the host device; parsing the input characters to detect a character sequence; and connecting the serial port interface to a first service executing in the virtualization software in response to the character sequence and during execution of the virtualization software on the host device.

20 Claims, 5 Drawing Sheets

DYNAMICALLY MANAGING A SERIAL PORT INTERFACE OF VIRTUALIZATION SOFTWARE ON HOST DEVICE WHEREIN EXECUTION IS PERFORMED NOT DURING BOOT SEQUENCE

BACKGROUND

Computer virtualization is a technique that involves encapsulating a physical computing machine platform into virtual machine(s) executing under control of virtualization software on a hardware computing platform or "host." A virtual machine provides virtual hardware abstractions for processor, memory, storage, and the like to a guest operating system. The virtualization software, also referred to as a "hypervisor", includes or more virtual machine monitors (VMMs) to manage the virtual machine(s). The virtualization software can execute various services that can be accessed locally on the host in order to initially configure the virtualization software. For example, an administrator can use a keyboard, mouse, and display of the host to interact with the console user interface service and perform local configuration of the virtualization software, such as configuration of network options. In another example, an administrator can use a keyboard, mouse, and display of the host to view logging information output by the virtualization software. Once local configuration is complete, an administrator can remotely access the virtualization software through a network interface using an application on a remote device.

Virtualization can also be provided on computing devices that have been configured to operate without a display, keyboard, mouse, and like type human interface devices, such as network appliances and the like. Such computing devices are referred to as being "headless." In general, the virtualization software can provide access to services used for local configuration through an alternative channel, such as a serial port. For headless computing devices, the alternative channel can be the only available mechanism for locally configuring the virtualization software. Heretofore, a serial interface of the virtualization software is connected to a particular default service at boot and remains connected to that service until the host is rebooted. An administrator must interrupt the boot process manually or create a custom virtualization software image in order to change the service connected to the serial interface. Even in the case of a custom virtualization software image, if the administrator desires to change the service connected to the serial interface, the host must be rebooted and the administrator must manually interrupt the boot process.

SUMMARY

One or more embodiments provide techniques to dynamically manage serial port interface(s) of virtualization software executing in a host device. In an embodiment, a method of managing a serial port interface of a virtualization software executing on a host device includes: receiving input characters through the serial port interface to a serial port of the host device; parsing the input characters to detect a character sequence; and connecting the serial port interface to a first service executing in the virtualization software in response to the character sequence and during execution of the virtualization software on the host device. Further embodiments include a non-transitory computer-readable storage medium comprising instructions that cause a computer system to carry out the above method above, as well as a computer system configured to carry out the above method.

DETAILED DESCRIPTION

Dynamic management of a serial port interface of virtualization software executing on a host is described. In various embodiments, the virtualization software monitors the serial port interface to a serial port of the host for input characters. Upon receiving input characters, the virtualization software parses the input characters to search for predefined character sequences. Each predefined character sequence corresponds to a particular service executing in the virtualization software. Upon detecting a particular predefined character sequence, the virtualization software dynamically connects the serial port interface to the corresponding service executing in the virtualization software. In this manner, the serial port interface can connect to different services executing in the virtualization software upon demand while the virtualization software is executing in the host and without rebooting the host. Moreover, the virtualization software can selectively connect the serial port interface to different services without the need for the host to have a monitor, keyboard, mouse, and/or like type human interface device. This allows for more efficient local configuration of headless hosts. These and further aspects are discussed below with respect to the following figures.

Figure 1:
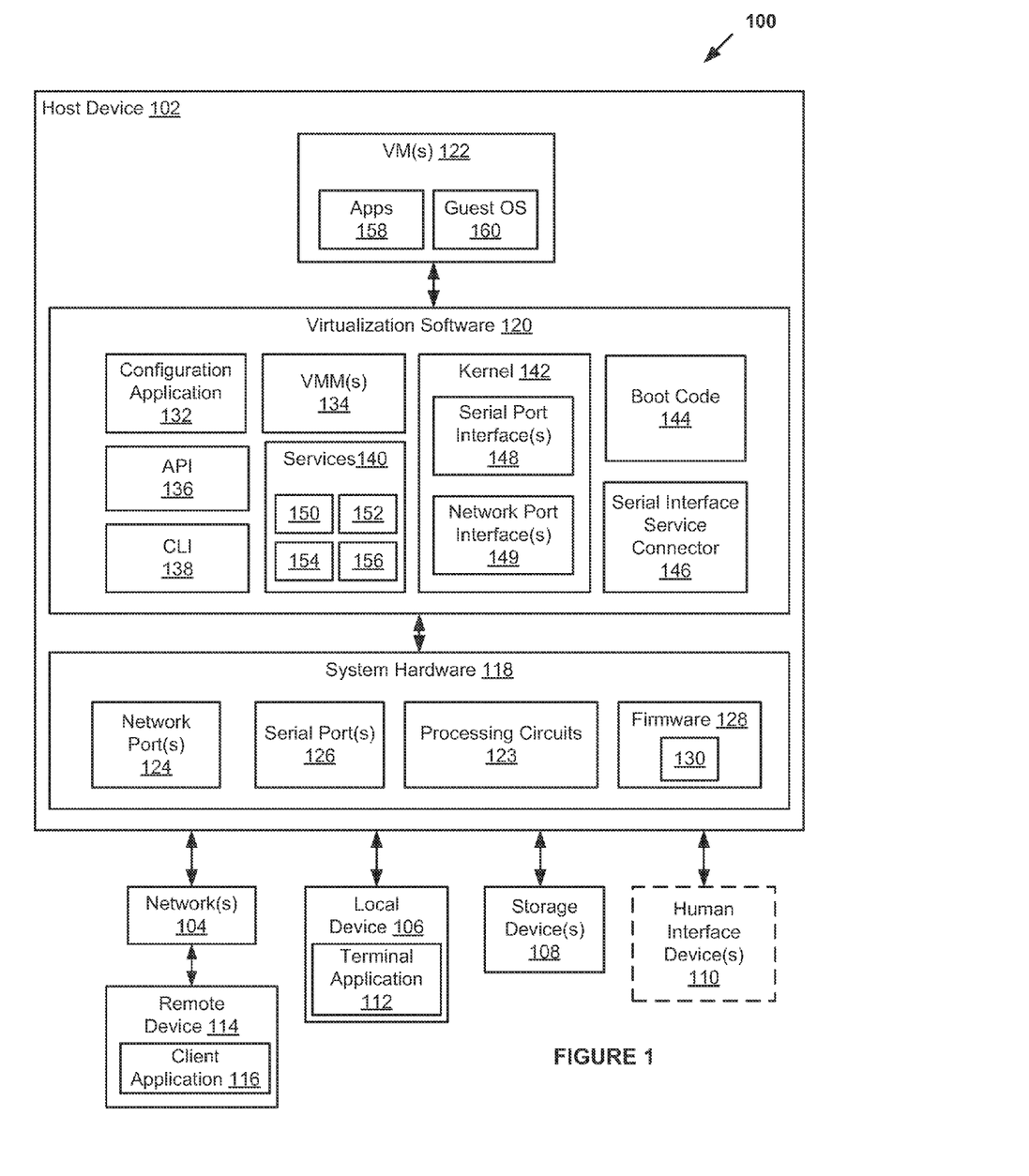
FIG. 1 is a block diagram of a virtualized computing system according to an embodiment.

FIG. 1 is a block diagram of a virtualized computing system 100 according to an embodiment. Virtualized computing system 100 includes a host device 102, which can be coupled to network(s) 104, a local device 106, storage device(s) 108. Host device 102 can be coupled to a remote device 114 through network(s) 104. Remote device 114 and local device 106 can be various types of computing devices capable of displaying data to and receiving data from users (e.g., computers, tablets, mobile devices, etc.). Local device 106 can include a terminal application 112 executing therein. Terminal application 112 can include, for example, a terminal emulator. Remote device 114 can include a client application 116 executing therein. Client application 116 can include a graphic user interface (GUI), text interface, or combination thereof. Storage devices 108 can include various types of mass-storage devices, such as hard disk drives, solid state drives, etc.

In one embodiment, host device 102 is not connected to a display, a keyboard, a mouse, or other type of human interface device. For example, host device 102 can be headless in that host device 102 does not support connection to a display, keyboard, mouse, or like type human interface device. Headless host devices can include, for example, various network appliances, such as routers, switches, and the like. In another embodiment, host device 102 does support connection to human interface device(s) 110 and can be coupled to a display, a keyboard, a mouse, and/or the like.

Figure 5:
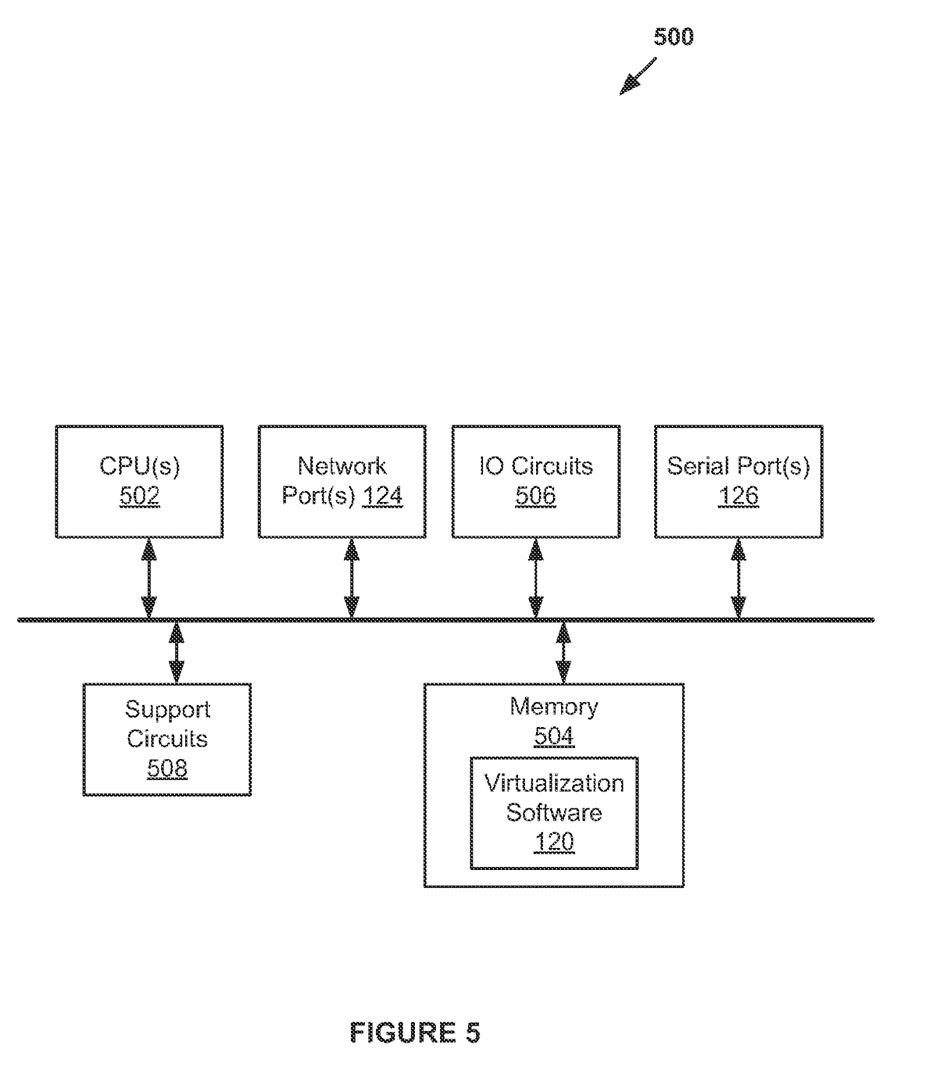
FIG. 5 is a block diagram depicting computing resources according to an example implementation.

Host device 102 includes system hardware 118, virtualization software 120, and VM(s) 122. System hardware 118 includes processing circuits 123, network port(s) 124, serial port(s) 126, and firmware 128. Processing circuits 123 can include microprocessor(s), random access memory (RAM), read only memory (ROM), input/output (10) circuits, various support circuits, and the like. An embodiment of processing circuits 123 is shown in FIG. 5. Network port(s) 124 can be coupled to network(s) 104 to facilitate communication between host device 102 and remote device 114. Serial port(s) 126 can be coupled to local device 106 using, for example, serial cable(s). The serial port(s) 126 can be compliant with the RS-232 standard or the like for serial transmission of data between two endpoints. For example, serial port(s) 126 can include one or more universal asynchronous receiver/transmitter (UART) circuits. Firmware 128 can include non-volatile memory to store code and data used by the system hardware 118, such as a basic input/output system (BIOS) or the like.

Virtualization software 120 is a software interface layer that abstracts system hardware 118 into virtual system hardware for use by VM(s) 122. Example virtualization software 120 is the vSphere® ESXi hypervisor commercially available from VMware, Inc. of Palo Alto, Calif. Virtualization software 120 includes, among other components, a configuration application 132, virtual machine monitor(s) (VMM(s)) 134, an application programming interface (API) 136, a command line interface (CLI) 138, services 140, a kernel 142, boot code 144, and serial port interface service connector 146. Kernel 142 interfaces with system hardware 118 and controls operation of virtualization software 120. Configuration application 132 is executable in virtualization software 120 to configure various options of virtualization software 120. API 136 provides an interface to virtualization software 120 for remote client applications to configure virtualization software 120, such as a client application 116 executing on remote device 114. API 136 can include, for example, one or more services and/or libraries managed by kernel 142. CLI 138 provides an execution environment for running commands and applications within virtualization software 120. CLI 138 can be accessed by client application 116 running on remote device 114. CLI 138 can include, for example, a service managed by kernel 142 (e.g., a secure shell (SSH) service). A user can directly execute configuration application 132 using CLI 138 to configure virtualization software 120. In another example, a user can interact with client application 116, and client application 116 can execute configuration application 132 through API 136. Services 140 can include various services, some of which are discussed below, managed by kernel 142. Boot code 144 can be executed by kernel 142 during a boot sequence of virtualization software 120. In general, serial port interface service connector 146 monitors for input characters on serial interface(s) 148 and dynamically connects service(s) to serial interface(s) 148 based on detection of predefined character sequence(s) in the input characters. Serial port interface service connector 146 can be implemented as a service, module, interrupt service routine (ISR), or the like capable of monitoring input to serial interface(s) 148.

Each of VM(s) 122 includes a guest operating system (OS) 160 and various applications 158 executable within the guest OS 160. VM(s) 122 run on virtual system hardware provided by VMM(s) 134. A user can create, remove, or otherwise manage VM(s) 122 using client application 116 on remote device 114.

In an embodiment, kernel 142 includes serial port interface(s) 148 to serial port(s) 126 in system hardware 118, and network port interface(s) 149 to network port(s) 124 in system hardware 118. Serial port interface(s) 148 comprise software that interfaces with the hardware of serial port(s) 126, such as a driver, module, or the like. Kernel 142 and/or other applications/services can communicate through serial port(s) 126 using serial port interface(s) 148. Kernel 142 can provide identifier(s) for serial port interface(s) 148, such as COM1, COM2, etc., or the like. Similarly, network port interface(s) 149 comprise software that interfaces with the hardware of network port(s) 124. Kernel 142 and/or other applications/services can communicate through network port(s) 124 using network port interface(s) 149. Kernel 142 can provide identifier(s) for network port interface(s) 149, such as ETH0, ETH1, etc., or the like. In the embodiment shown, serial port interface(s) 148 and network port interface(s) 149 are embedded in kernel 142. In other embodiments, serial port interface(s) 148 and/or network port interface(s) 149 can be part of separate drivers, modules, etc. external to kernel 142.

Virtualization software 120 can connect a service to each of serial port interface(s) 148, allowing a user to view output of a service and/or provide input to a service locally at the host device 102. A user can access a particular service through a serial port using terminal application 112 on local device 106. In an embodiment, services 140 include a direct console user interface (DCUI) service 150, a shell service 152, a logging service 154, and a debugging service 156. DCUI service 150 provides a text user interface (TUI) for local configuration of virtualization software 120. Local configuration can include, for example, setting a root password, setting network configuration, viewing system logs, restarting/shutting down virtualization software 120, and the like. Shell service 152 provides a command-line interpreter for a traditional text user interface. Logging service 154 provides output including log information generated by kernel 142. Debugging service 156 provides an interface to a debugger application. In an embodiment, virtualization software 120 can connect any of services 150-156 to a serial port interface dynamically during execution of virtualization software 120. In general, virtualization software 120 can connect any type of service configured for serial communication to a serial port interface during execution of virtualization software 120 in addition to services 150-156 described above.

When host device 102 powered on, system hardware 118 is initialized using firmware 128 and virtualization software 120 begins a boot sequence. During the boot sequence, kernel 142 executes boot code 144. A portion of boot code 144 initializes serial port interface(s) 148. In an embodiment, boot code 144 can access data 130 in firmware 128 to obtain serial port parameter data (e.g., speed, parity, flow control, etc.) for configuring serial communication through serial port(s) 126. Boot code 144 can also access data 130 to examine a headless flag that indicates whether host device 102 is headless. Data 130 can include, for example, various advanced configuration and power interface (ACPI) tables, such as a serial port console redirection (SPCR) table, fixed ACPI descriptor table (FADT), and the like. In embodiments, boot code 144 can obtain serial port parameter data from an SPCR table, and headless flag data from an FADT table.

In an embodiment, boot code 144 can connect initial service(s) to serial port interface(s) 148 during the boot sequence. The connection of initial service(s) to serial port interface(s) 148 can be unconditional (e.g., the same default service is always connected to a given serial port interface until changed by a user) or conditional. In an embodiment, conditional connection of default service(s) to serial port interface(s) 148 can be based on data 130. For example, if boot code 144 determines host device 102 is headless, boot code 144 can connect DCUI service 150 to a serial port interface. If boot code 144 determines host device 102 is not headless, boot code 144 can connect logging service 154 to a serial port interface. In general, boot code 144 can connect any service to a serial port interface depending on data 130, such as state of a headless flag. In an embodiment, conditional connection of default service(s) to serial port interface(s) 148 can be based on boot options that are parametric input to the boot sequence (e.g., boot parameters selected by a user by interrupting the boot sequence or providing a custom image of virtualization software 120). In another embodiment, boot code 144 can omit connecting initial service(s) to serial port interface(s) 148. That is, serial port interface(s) 148 can be initially unconnected to any service.

After the boot sequence, virtualization software 120 begins monitoring for input characters to serial port interface(s) 148. A user provide input characters to a serial port interface using terminal application 112 on local device 106. In an embodiment, virtualization software 120 can monitor for input characters using serial port interface service connector 146. Serial port interface service connector 146 can parse input characters to each of serial port interface(s) 148. For each serial port interface, serial port interface service connector 146 can search for predefined character sequences corresponding to particular services that can be connected to the serial port interface. Each predefined character sequence comprises one or more characters. In an embodiment, each predefined character sequence comprises a header followed by unique character(s) associated with a given service. In a non-limiting example, the predefined character sequences can be 'Ctrl-g', 'Ctrl-b', '1' for logging service 154, 'Ctrl-g', 'Ctrl-b', '2' for shell service 152, 'Ctrl-g', 'Ctrl-b', '3' for DCUI service 150, and 'Ctrl-g', 'Ctrl-b', '?' for debugging service 156. Such character sequences are just some of a myriad of example character sequences.

Upon detecting a predefined character sequence, serial port interface service connector 146 connects the corresponding service to the serial port interface. For example, serial port interface service connector 146 can search for character sequences assigned to DCUI service 150, shell service 152, logging service 154, and debugging service 156. In this manner, virtualization software 120 can connect a service to a serial port interface dynamically during execution and on demand in response to user input.

The dynamic assignment of services to serial port interface(s) can assist various configuration tasks, such as local configuration of virtualization software 120 and debugging or otherwise detecting problems with virtualization software 120. When virtualization software 120 is first provisioned on host device 102, a user can perform local configuration in order to establish a root password and a valid network configuration. To perform the local configuration, a user can access DCUI service 150 or shell service 152 through serial interface(s) 148 using terminal application 112 on local device 106. For example, host device 102 can be headless such that serial interface(s) 148 are the only mechanism to access DCUI service 150 or shell service 152 for local configuration. In another example, the primary channel of a host device that is not headless (e.g., display, keyboard, and mouse) may be unavailable. In some cases, virtualization software 120 may connect DCUI service 150 or shell service 152 to a serial port interface during the boot sequence. If not, the user can enter a predefined character sequence as character input to the serial port interface in order to connect DCUI service 150 or shell service 152 to the serial port interface. If during local configuration the user desires to view a system log or invoke debugging, the user can enter a predefined character sequence as character input to the serial port interface in order to connect logging service 154 or debugging service 156 to the serial port interface. As noted above, the service connected to a serial port interface can be assigned dynamically during execution of virtualization software 120 without rebooting host device 102.

Figure 2:
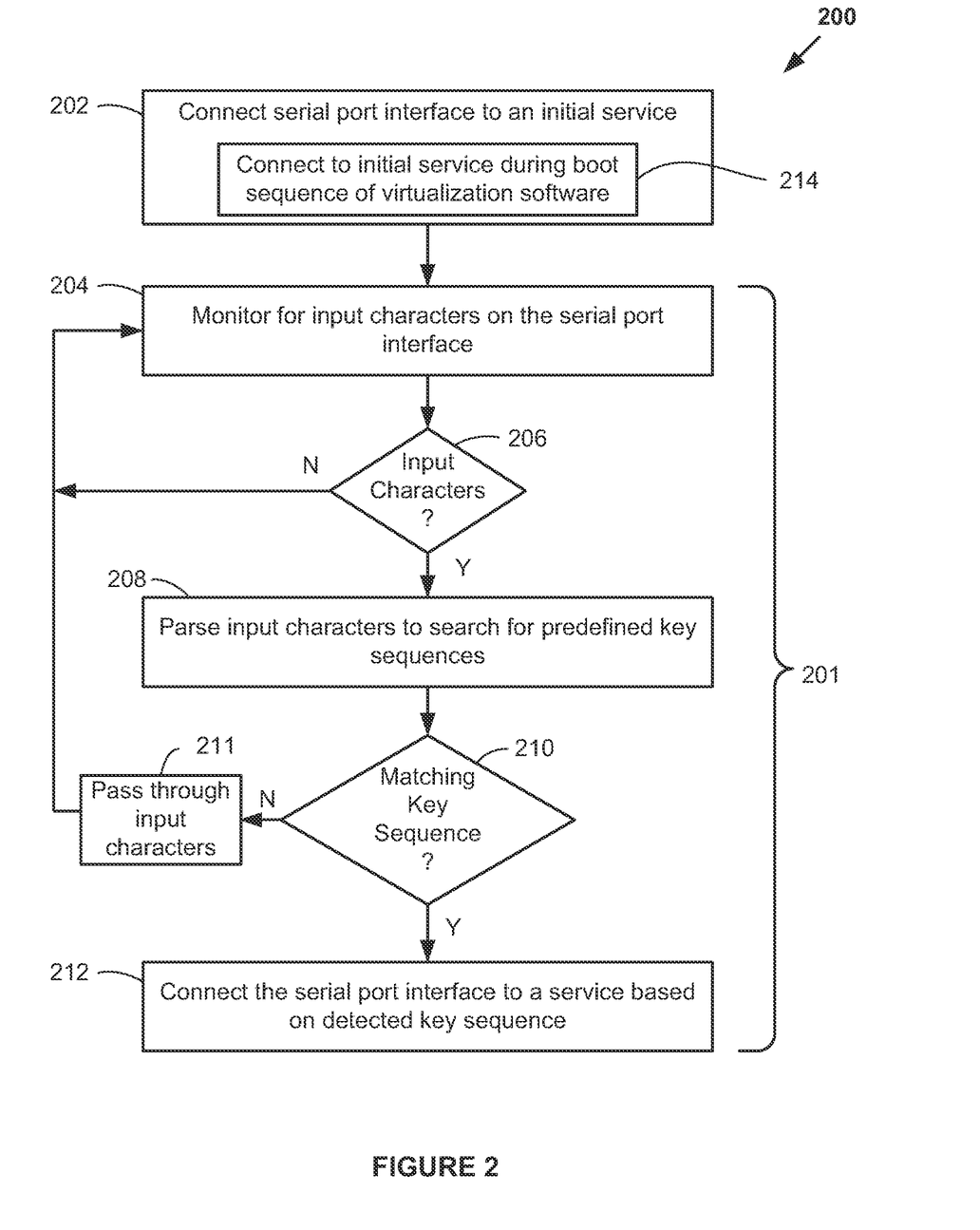
FIG. 2 is a flow diagram depicting a method of managing a serial port interface of virtualization software executing on a host device according to an embodiment.

FIG. 2 is a flow diagram depicting a method 200 of managing a serial port interface of virtualization software executing on a host device according to an embodiment. Method 200 can be performed by virtualization software 120 in host device 102 described above. Method 200 begins at step 202, where virtualization software 120 can connect the serial port interface to an initial service. For example, at step 214, virtualization software 120 can connect the serial port interface to an initial service during a boot sequence. In another embodiment, step 202 can be omitted and the serial port interface can be initially unconnected to any service.

At step 204, virtualization software 120 monitors for input characters on the serial port interface. At step 206, virtualization software 120 determines if input characters have been received to the serial port interface. If not, method 200 returns to step 204 and continues monitoring for input characters. Otherwise, method 200 proceeds to step 208, where virtualization software 120 parses the input characters to search for predefined character sequences. At step 210, virtualization software 120 determines if the input characters include a character sequence that matches one of the predefined character sequences. If not, method 200 proceeds to step 211, where the input characters are passed through. Method 200 returns to step 204 from step 211. If at step 210 the input characters include a character sequence that matches one of the predefined character sequences, method 200 proceeds to step 212, where virtualization software 120 connects the serial port interface to a service based on the detected character sequence.

In embodiments above, a service connected to a serial port interface is changed based on input received through the serial port interface itself. In some embodiments, a service connected to a serial port interface can be changed in response to input received through another channel, such as through network port interface(s) 149. A user can provide input through client application 116 on remote device 114 to change the service connected to a particular serial port interface. For example, a user can execute configuration application 132 directly through CLI 138 or indirectly through API 136. Configuration application 132 can perform steps similar to serial port interface service connector 146 upon detection of a particular character sequence to change the service connected to the serial port interface.

For example, current versions of the vSphere® ESXi hypervisor include a configuration application 'esxcfg-advcfg' used to set various options. A user can execute 'esxcfg-advcfg-s com1/Misc/ConsolePort' in CLI 138 to assign DCUI service 150 to the serial interface identified by com1. A user can execute 'esxcfg-advcfg -s com1/Misc/ShellPort' in CLI 138 to assign shell service 152 to the serial interface identified by com1. A user can execute 'esxcfg-advcfg -s com1/Misc/LogPort' in CLI 138 to assign logging service 154 to the serial interface identified by com1. A user can execute 'esxcfg-advcfg -s com1/Misc/GDBport' in CLI 138 to assign debugging service 156 to the serial interface identified by com1. The files '/Misc/ConsolePort', '/Misc/ShellPort', '/Misc/LogPort', and '/Misc/GDBPort' can be device files, links, or the like used to access DCUI service 150, shell service 152, logging service 154, and debugging service 156. In an embodiment, a given serial port interface can be first disconnected from a current service before being connected to a new service. For example, a user can execute 'esxcfg-advcfg -s none /Misc/LogPort' before 'esxcfg-advcfg -s com1 /Misc/ConsolePort'.

Figure 3:
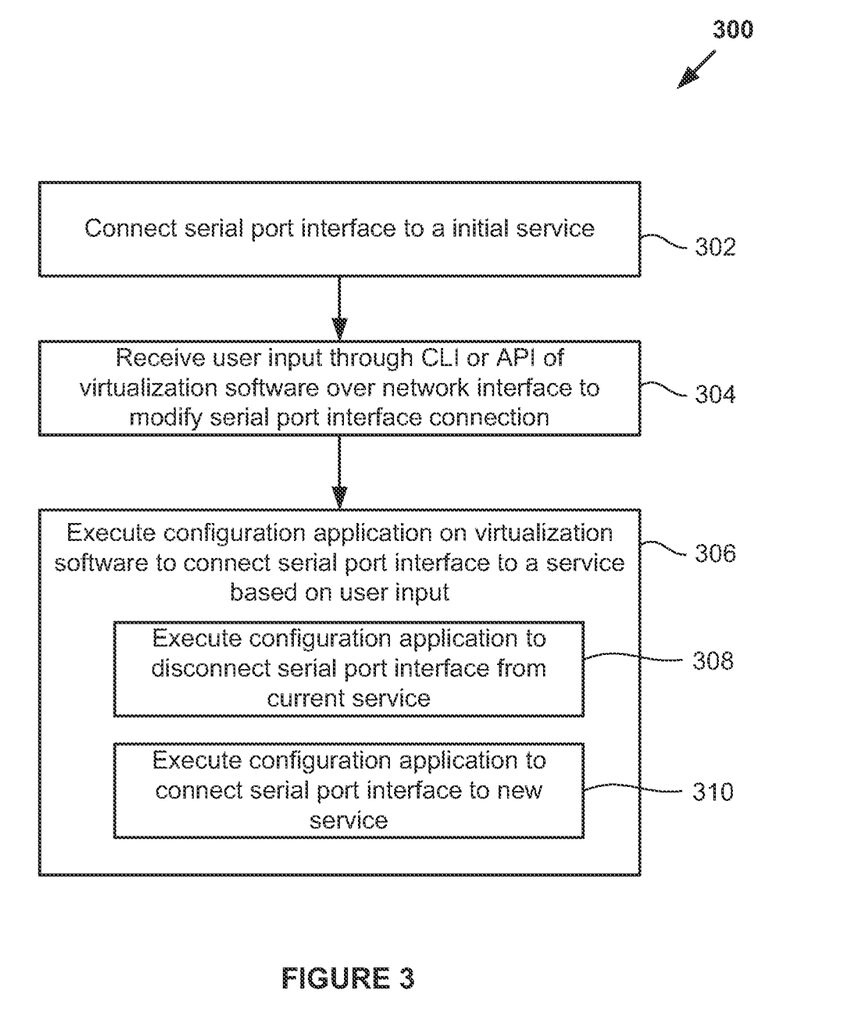
FIG. 3 is a flow diagram depicting another method of managing a serial port interface of virtualization software executing on a host device according to an embodiment.

FIG. 3 is a flow diagram depicting a method 300 of managing a serial port interface of virtualization software executing on a host device according to an embodiment. Method 300 can be performed by virtualization software 120 in host device 102 described above. Method 300 begins at step 302, where virtualization software 120 connects the serial port interface to an initial service. In another embodiment, step 302 is omitted and the serial port interface can be initially unconnected to any service. At step 304, virtualization software 120 receives user input through CLI 138 or API 136 over a network port interface to change the service connected to the serial port interface. At step 306, virtualization software 120 executes configuration application 132 to connect serial port interface to a service based on the user input. In an embodiment, step 306 includes a step 308, where virtualization software 120 executes configuration application 132 to disconnect the serial port interface from the current service. At step 310, virtualization software 120 executes configuration application 132 to connect the serial port interface to a new service.

Figure 4:
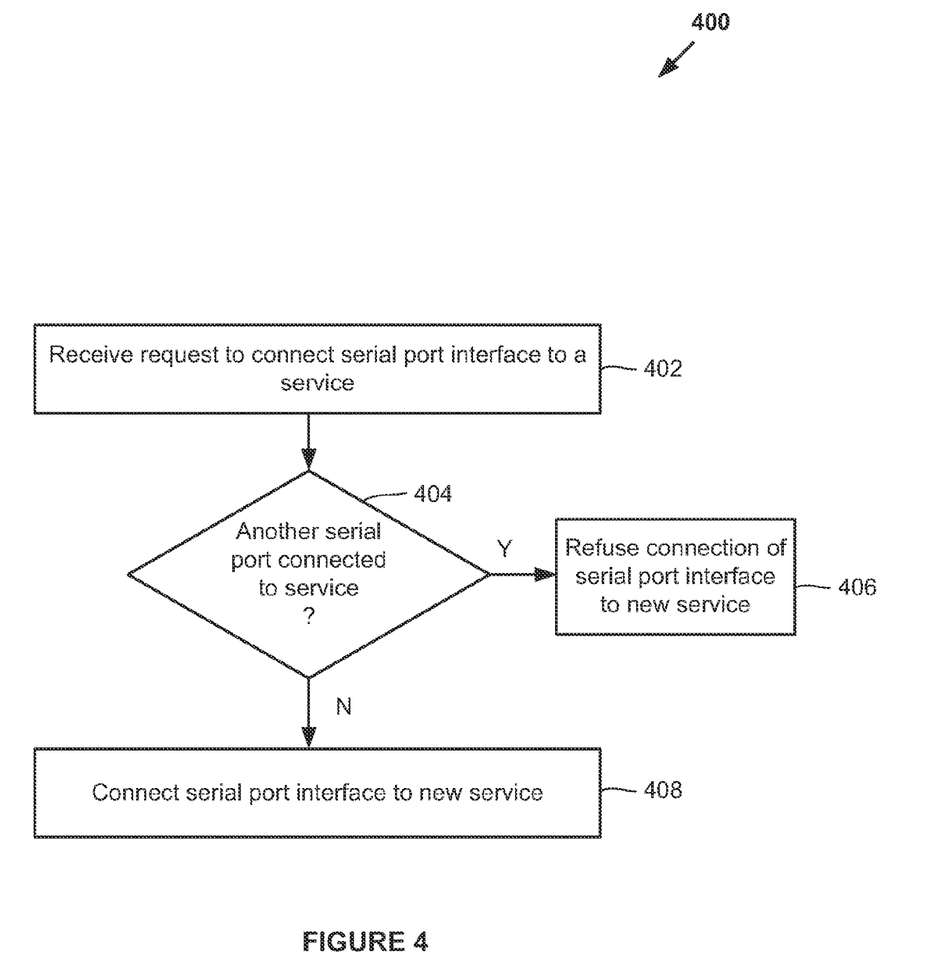
FIG. 4 is a flow diagram depicting yet another method of managing a serial port interface of virtualization software executing on a host device according to an embodiment.

In some embodiments, system hardware 118 can include multiple serial ports 126. In such case, virtualization software 120 can enforce a rule that a given service can only be connected to one serial port interface at a time. FIG. 4 is a flow diagram depicting a method 400 of managing a serial port interface of virtualization software executing on a host device according to an embodiment. Method 400 can be performed by virtualization software 120 in host device 102 described above. Method 400 begins at step 402, where virtualization software 120 receives a request to connect a service to a serial port interface. At step 404, virtualization software 120 determines whether the service is already connected to another serial port interface. If so, method 400 proceeds to step 406, where virtualization software 120 refuses to connect the service to the requested serial port interface. Otherwise, method 400 proceeds to step 408, where virtualization software 120 connects the service to the requested serial port interface.

FIG. 5 is a block diagram depicting computing resources 500 according to an example implementation. Computing resources 500 can be used to implement processing circuits 123 of system hardware 118. Computing resources 500 include one or more central processing units (CPUs) 502, memory 504, input/output (IO) circuits 506, and various support circuits 508. Each of CPUs 502 can include any microprocessor known in the art and can execute instructions stored on computer readable storage, such as memory 504. Memory 504 can include various volatile and/or non-volatile memory devices, such as random access memory (RAM), read only memory (ROM), and the like. Instructions for performing the various methods and techniques of virtualization software 120 described above can be stored in memory 504 for execution by CPUs 502. That is, memory 504 can store instructions executable by CPUs 502 to perform method 200, method 300, or method 400, or any combination thereof. IO circuits 506 facilitate access to network port(s) 124 and serial port(s) 126 for CPUs 602. Support circuits 508 include various circuits used to support operation of a computer system as known in the art.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of managing a serial port interface of virtualization software executing on a host device, comprising:
   receiving input characters through the serial port interface to a hardware serial port of the host device;
   parsing the input characters to detect a character sequence; and
   connecting the serial port interface to a first service executing in the virtualization software in response to the character sequence and during execution of the virtualization software on the host device and not during a boot sequence.

2. The method of claim 1, wherein the host device is a headless device not supporting connection to any human interface device.

3. The method of claim 1, wherein the first service is one of a plurality of services executable in the virtualization software, the plurality of services including a console user interface service, a shell service, a logging service, and a debugging service.

4. The method of claim 1, further comprising: connecting the serial port interface to a second service executing in the virtualization software in response to execution of a configuration application by the virtualization software.

5. The method of claim 4, wherein the configuration application is executed by the virtualization software in response to user input to a command line interface of the virtualization software, or an application programming interface of the virtualization software, received through a network port of the host device.

6. The method of claim 4, wherein the configuration application disconnects the serial port interface from the first service and connects the serial port interface to the second service.

7. The method of claim 1, further comprising:
   connecting the serial port interface to an initial service during a boot sequence of the virtualization software based on data stored in firmware of the host device.

8. The method of claim 7, wherein the data stored in the firmware comprises at least one of a headless flag and hardware serial port parameter data.

9. The method of claim 1, further comprising:
   connecting the serial port interface to an initial service during a boot sequence of the virtualization software based on boot options that are parametric input to the boot sequence.

10. The method of claim 1, further comprising:
    receiving a request to connect the serial port interface to a second service executing in the virtualization software; and
    refusing the request in response to another serial port interface being connected to the second service.

11. A computing device executing virtualization software, the computing device comprising:
    a hardware serial port;
    a memory having a program for managing a serial port interface of the virtualization software to the hardware serial port; and
    a processor configured to execute the program to:
    receive input characters through the serial port interface;
    parse the input characters to detect a character sequence; and
    connect the serial port interface to a first service executing in the virtualization software in response to the character sequence and during execution of the virtualization software on the computing device and not during a boot sequence.

12. The computing device of claim 11, wherein the computing device is a headless device not supporting connection to any human interface device.

13. The computing device of claim 11, wherein the processor is further configured to execute the program to:
    connect the serial port interface to a second service executing in the virtualization software in response to execution of a configuration application by the virtualization software.

14. The computing device of claim 13, further comprising:
    a network port;
    wherein the configuration application is executed by the virtualization software in response to user input to a command line interface of the virtualization software, or an application programming interface of the virtualization software, received through the network port.

15. The computing device of claim 11, further comprising:
    another hardware serial port;
    wherein the processor is further configured to execute the program to:
    receive a request to connect the serial port interface to a second service executing in the virtualization software; and
    refuse the request in response to another serial port interface of the virtualization software to the other hardware serial port being connected to the second service.

16. A non-transitory computer-readable storage medium comprising instructions, which when executed in a computer system, causes the computer system to carry out a method of managing a serial port interface of virtualization software executing on a host device, the method comprising:
    receiving input characters through the serial port interface to a hardware serial port of the host device;
    parsing the input characters to detect a character sequence; and
    connecting the serial port interface to a first service executing in the virtualization software in response to the character sequence and during execution of the virtualization software on the host device and not during a boot sequence.

17. The non-transitory computer-readable storage medium of claim 16, wherein the host device is a headless device not supporting connection to any human interface device.

18. The non-transitory computer-readable storage medium of claim 16, further comprising:
connecting the serial port interface to a second service executing in the virtualization software in response to execution of a configuration application by the virtualization software.

19. The non-transitory computer-readable storage medium of claim 16, further comprising:
connecting the serial port interface to an initial service during a boot sequence of the virtualization software based on data stored in firmware of the host device.

20. The non-transitory computer-readable storage medium of claim 16, further comprising:
receiving a request to connect the serial port interface to a second service executing in the virtualization software; and
refusing the request in response to another serial port interface being connected to the second service.

* * * * *